United States Patent
Munkberg et al.

(10) Patent No.: US 9,483,869 B2
(45) Date of Patent: Nov. 1, 2016

(54) LAYERED RECONSTRUCTION FOR DEFOCUS AND MOTION BLUR

(71) Applicant: Intel Corporation, Santa Clara, CA (US)

(72) Inventors: Carl J. Munkberg, Malmo (SE); Karthik Vaidyanathan, Berkeley, CA (US); Jon N. Hasselgren, Bunkeflostrand (SE); Franz P. Clarberg, Lund (SE); Tomas G. Akenine-Moller, Lund (SE); Marco Salvi, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 297 days.

(21) Appl. No.: 14/274,958

(22) Filed: May 12, 2014

(65) Prior Publication Data
US 2015/0206340 A1     Jul. 23, 2015

Related U.S. Application Data

(60) Provisional application No. 61/928,478, filed on Jan. 17, 2014.

(51) Int. Cl.
| | |
|---|---|
| *G06T 15/50* | (2011.01) |
| *G06T 15/06* | (2011.01) |
| *G06T 5/50* | (2006.01) |
| *H04N 5/232* | (2006.01) |

(52) U.S. Cl.
CPC ............... *G06T 15/503* (2013.01); *G06T 5/50* (2013.01); *G06T 15/06* (2013.01); *G06T 15/506* (2013.01); *G06T 2200/21* (2013.01); *G06T 2207/10052* (2013.01); *H04N 5/23229* (2013.01)

(58) Field of Classification Search
None
See application file for complete search history.

(56) References Cited

U.S. PATENT DOCUMENTS

| | | | | |
|---|---|---|---|---|
| 2004/0114794 A1* | 6/2004 | Vlasic | ................... | G06T 15/205 382/154 |
| 2009/0244300 A1* | 10/2009 | Levin | ..................... | G03B 17/00 348/208.5 |
| 2014/0118529 A1* | 5/2014 | Zheng | ...................... | G21K 7/00 348/80 |
| 2014/0176540 A1* | 6/2014 | Tosic | ...................... | G06T 17/00 345/420 |
| 2014/0204111 A1* | 7/2014 | Vaidyanathan | .... | G02B 27/0075 345/592 |

OTHER PUBLICATIONS

Kroes T, Post FH, Botha CP (2012) "Exposure Render: An Interactive Photo-Realistic Volume Rendering Framework", PLoS ONE 7(7): e38586. doi:10.1371/journal.pone.0038586.*
U.S. Appl. No. 14/156,722, filed Jan. 16, 2014 entitled "Layered Light Field Reconstruction for Defocus Blur".

* cited by examiner

*Primary Examiner* — James A Thompson
(74) *Attorney, Agent, or Firm* — Trop Pruner & Hu, P.C.

(57) ABSTRACT

Real-time light field reconstruction for defocus blur may be used to handle the case of simultaneous defocus and motion blur. By carefully introducing a few approximations, a very efficient sheared reconstruction filter is derived, which produces high quality images even for a very low number of input samples in some embodiments. The algorithm may be temporally robust, and is about two orders of magnitude faster than previous work, making it suitable for both real-time rendering and as a post-processing pass for high quality rendering in some embodiments.

30 Claims, 7 Drawing Sheets

LAYERED RECONSTRUCTION FOR DEFOCUS AND MOTION BLUR

CROSS-REFERENCE TO RELATED APPLICATIONS

This non-provisional application claims priority to provisional application Ser. No. 61/928,478, filed on Jan. 17, 2014, hereby expressly incorporated by reference herein.

BACKGROUND

Light field reconstruction algorithms can substantially decrease the noise in stochastically rendered images with few samples per pixel. Current algorithms for defocus blur alone are both fast and accurate. However, motion blur is a considerably more complex type of camera effect, and as a consequence, current algorithms are either slow or too imprecise to use in high quality rendering.

Stochastic sampling is a powerful technique that can simulate realistic camera effects. This is achieved by evaluating a high-dimensional integral using point sampling. Motion blur is obtained by distributing samples over the open camera shutter, and depth of field by point sampling over the camera lens. However, as with most Monte Carlo techniques, a large number of samples must be drawn to reduce noise of the integral to acceptable levels. A different way to tackle this problem is to instead spend efforts on reconstructing a final image with substantially reduced noise from a sparsely sampled input image, e.g., with as few as 4 or 8 samples per pixel.

Accurately reconstructing the four-dimensional light field for depth of field is well understood. The algorithm by Vaidyanathan et al. can reconstruct images with defocus blur from a small number of samples per pixel with real-time performance. Reconstructing motion blur, and the combination of motion blur and depth of field is a harder problem, as each object and the camera can have arbitrary motion (i.e., a unique 3D motion vector for each vertex in the scene). In contrast, defocus blur is a function of the vertex depth and a few camera constants. Hence, motion blur is, in some sense, a more difficult integral to evaluate.

BRIEF DESCRIPTION OF THE DRAWINGS

Some embodiments are described with respect to the following figures.

DETAILED DESCRIPTION

Real-time light field reconstruction may be applied to the case of simultaneous defocus and motion blur. By carefully introducing a few approximations, a very efficient sheared reconstruction filter can be derived, which produces high quality images even for a very low number of input samples, in some embodiments. The algorithm is temporally robust, and is about two orders of magnitude faster than previous work, making it suitable for both real-time rendering and as a post-processing pass for high quality rendering, in one embodiment.

Figure 1:
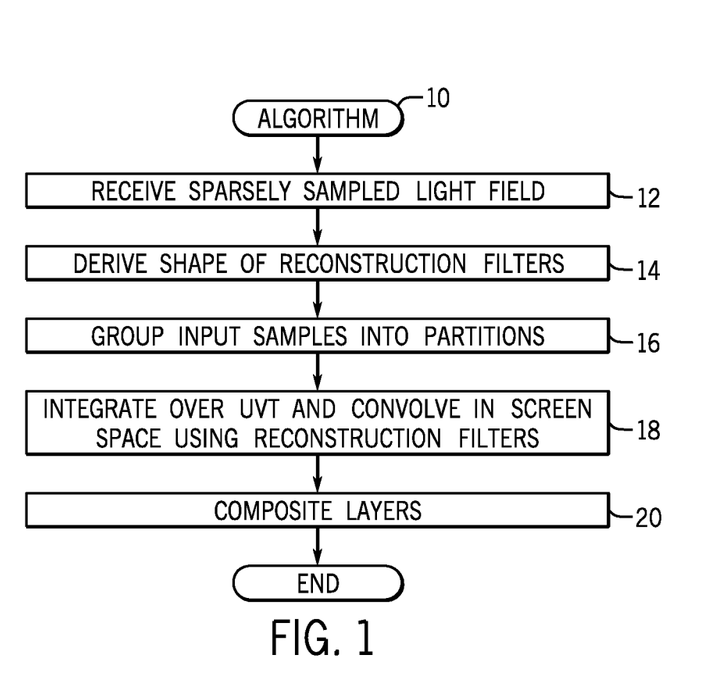
FIG. 1 is a flow chart for one embodiment.

The algorithm 10, shown in FIG. 1, may be implemented in software, firmware and/or hardware. Software and firmware embodiments may be implemented by computer executed instructions stored in one or more non-transitory computer readable media, such as magnetic, optical, or semiconductor storages. The instructions may be implemented by a dedicated graphics processor, a central processing unit, or a combined central processing unit and graphics processor, to mention some examples.

The input to the algorithm 10 is a sparsely, stochastically sampled light field generated either by a distributed ray tracer or stochastic rasterizer, as shown at block 12. Note that it does not rely on adaptive sampling, but treats the sample generation pass as a black box. By analyzing the problem at hand in the frequency domain using recent tools, and by cautiously introducing some approximations, a highly efficient filter can be used in an augmented layered composition framework.

In some embodiments, the input to algorithm 10 is a light field generated by pseudo-random sampling in an interleaved rasterizer or ray tracer. In another embodiment, the input is a regularly sampled light field.

This algorithm can compete with the quality of algorithms designed to work on stochastic light fields while performing closer to the more approximate techniques targeting real-time rendering. In one embodiment, the algorithm runs in approximately 50 ms at 1280×720 pixels resolution on a discrete graphics card, making it potentially useful in real-time graphics. It can also be useful as a post processing tool for reducing noise in offline rendering.

The light field samples may be expressed on the form: $x:(x_i,y_i,u_i,v_i,t_i) \rightarrow (z_i,d_i,l_i)$, e.g., the light field stores a depth $z_i$, a 3D motion vector $d_i$, and radiance value $l_i$ for each 5D input coordinate $(x_i,y_i,u_i,v_i,t_i)$, where $(x_i,y_i)$ are pixel coordinates, $(u_i,v_i)$ are lens positions, and $t_i$ is the time within the frame. In contrast to most previous work, this algorithm, in some embodiments, produces a smooth reconstructed image by operating on a fixed number of light field samples per pixel, e.g., four samples per pixel (spp), instead of relying on a feedback loop for adaptive sampling.

To derive the shape of the reconstruction filter (block 14) for the case of simultaneous defocus and motion blur, the light field analysis of Belcour et al. 2013 may be applied. See Belcour, et al., 5D Covariance Tracing for Efficient Defocus and Motion Blur, ACM Transaction on Graphics 32, 3, 31:1:-31:18 (2013). A unique reconstruction filter is derived for each partition, where a partition is defined as a set of samples within a depth range within a screen space tile. A first order approximation of motion is made, where a 3D motion vector for a light field sample is approximated by its projection on the xy-plane. Furthermore, a Gaussian shutter function and lens aperture is assumed, which simplifies the frequency analysis. Since an isotropic 2D Gaussian is radially symmetric, it is possible to formulate a simplified light field analysis in a rotated coordinate system.

The input samples are grouped into partitions, i.e., a set of depth layers for each screen space tile, as indicated in block 16. In contrast to most previous work, which derives a unique filter per pixel, a common sheared reconstruction filter kernel in 5D is applied for all samples within a partition, in one embodiment. This, somewhat coarser, approximation allows for a very efficient implementation in some embodiments.

Next, radiance and opacity is integrated over pixel coordinates and time (uvt), and convolved in screen space using the reconstruction filter, as shown in block 18. This provides a filtered irradiance and opacity for each layer. Finally, the layers are composited in front-to-back order using alpha blending based on the opacity values, as indicated in block 20.

The algorithm extends the work in defocus blur reconstruction by Vaidyanathan et al., 2013, that partitions samples in screen space tiles and depth layers, and derives a common reconstruction filter for each partition, not a unique filter per pixel. Their filter is anisotropic in (x,u) and (y,v), implemented efficiently as a separable sheared filter.

In the combined case of defocus and motion blur, the light field is anisotropic in the five-dimensional space (xyuvt), and a reconstruction filter is no longer trivially separable due to motion blur. However, by using an extended light field analysis, a separable anisotropic filter can handle the combined case of defocus and motion blur. It can be implemented very efficiently with near real-time performance in some embodiments.

Figure 2:
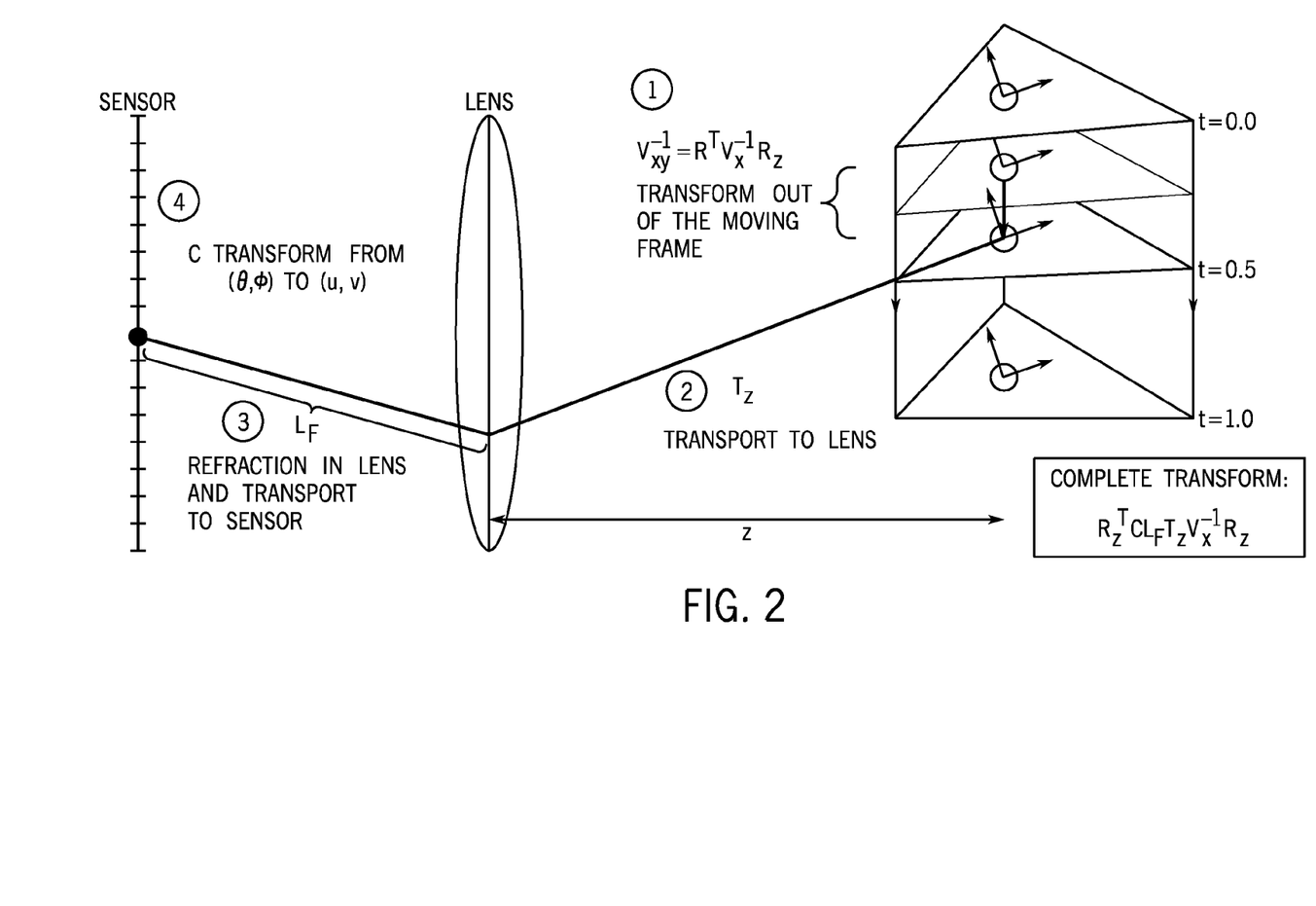
FIG. 2 is a depiction of a light field transformation from a moving diffuse emitter (right) at depth z to the light field at the sensor (left).

The light field analysis by Durand et al., 2005 may be followed which includes the extensions of a thin lens and first-order motion. See Durand, et al., A Frequency Analysis of Light Transport, ACM Transactions on Graphics 24, 3, 1115-1126 (2003). A space-angle parameterization: $(x,y,\theta,\phi,t)$ may be used, letting corresponding frequencies be denoted $\Omega$, e.g., $x \rightarrow \Omega_x$. The light field of a moving, diffuse, radiance emitter at depth z may be transformed to the light field at the sensor using a sequence of linear operators. As shown in FIG. 2, the sequence of operators in this case is:

1. Transform out of the moving coordinate system $(V_{xy}^{-1})$.
2. Transport to the lens $(T_z)$.
3. Refraction in lens and transport to sensor $(L_F)$.
4. Coordinate transform $C:(x,y,\theta,\phi,t) \rightarrow (x,y,u,v,t)$ The combination of these linear operators forms a linear operator:

$$CL_F T_z V_{xy}^{-1}, \qquad (1)$$

which transforms the light field from the moving coordinate system at depth z to the light field at the sensor. Each operator is a 5×5 matrix, which are included in Appendix A for reference. The differences from Belcour et al.'s analysis include a coordinate transform, $C:(\theta,\phi) \rightarrow (u,v)$, i.e., from angles to lens coordinates at the sensor, and expressing the motion operator in terms of rotations and a motion purely along x, according to: $V_{xy}=R_z^T V_x R_z$. The last transform is particularly important since it transforms the coordinate system so that the motion occurs only along the x-axis, which makes for a very fast implementation.

Inserting $V_{xy}=R_z^T V_x R_z$ into Equation 1 and rearranging, gives:

$$CL_F T_z V_{xy}^{-1} = R_z^T \underbrace{CL_F T_z V_x^{-1}}_{M} R_z. \qquad (2)$$

where $CL_F T_z R_z^T = R_z^T CL_F T_z$. With the change of variables: y=Rx, the light field transform can be expressed in the rotated frame as:

$$y_{[sensor]} = My_{[moving\ frame\ at\ depth\ z]}. \qquad (3)$$

This is the light field transform expressed in a coordinate system where the motion vector is aligned with the x-axis. The expression for M on matrix form can be found in Appendix A. In the rotated coordinate system, the linear operator (Equation 1) of the light field is simplified, which allows for a highly efficient implementation of the reconstruction filter.

In the Fourier domain at depth z, in a coordinate system following a moving diffuse emitter, the radiance spectrum, expressed in (rotated) frequencies $\Omega^z=(\Omega_x^z,\Omega_y^z,\Omega_\theta^z,\Omega_\phi^z,\Omega_t^z)$ has the shape:

$$L(\Omega_x^z,\Omega_y^z)\delta(\Omega_\theta^z)\delta(\Omega_\phi^z)\delta(\Omega_t^z), \qquad (4)$$

where $L(\Omega_x^z,\Omega_y^z)$ represents the spatial frequencies of the emitter. A diffuse emitter has no angular variation, which gives the Dirac, $\delta$, in $\Omega_\theta^z$ and $\Omega_\phi^z$. The Dirac in $\Omega_t^z$ follows from that the emitter is, by construction, static within the moving frame.

With the linear transform, M, from Equation 2, the spectrum at the sensor may be related to the spectrum at depth z. The frequencies at the sensor may be denoted with $\Omega$ and frequencies at the moving frame at depth z may be denoted with $\Omega^z$. When applying a linear transform M in the primal domain, the corresponding transform in the Fourier domain is $M^{-T}$ (up to a scaling factor). Thus, in this case: $\Omega=M^{-T}\Omega^z \Leftrightarrow \Omega^z=M^T\Omega$.

With this, the Dirac functions from Equation 4 can be expressed in terms of sensor frequencies $(\Omega_x,\Omega_y,\Omega_u,\Omega_v,\Omega_t)$:

$$\delta(\Omega_\theta^z) = \delta\left(\frac{z-F}{F}\Omega_x - z\Omega_u\right), \qquad (5)$$

$$\delta(\Omega_\phi^z) = \delta\left(\frac{z-F}{F}\Omega_y - z\Omega_v\right),$$

$$\delta(\Omega_t^z) = \delta\left(\frac{d_x}{z}\Omega_x + \Omega_t\right).$$

These equations show that the energy in the light field spectrum at the sensor is restricted to a plane, $\pi$ in 5D. This plane through the origin can be written on parametric form:

$$\pi(\Omega_x, \Omega_y): \left(\Omega_x, \Omega_y, c(z)\Omega_x, c(z)\Omega_y, -\frac{d_x}{z}\Omega_x\right), \qquad (6)$$

where the notation $$c(z) = \frac{z-F}{zF}$$

is introduced, which is a constant proportional to the circle of confusion. Next, an efficient reconstruction filter may be designed to capture this frequency spectrum at the sensor. Note that this frequency analysis is only valid for a purely diffuse, fully visible, emitter, and does not take occlusions or angular bidirectional reflectance distribution function (BRDF) variations into account. We handle occlusions using a depth layer partition and compositing scheme.

The samples may be split into screen space tiles and each tile partitioned into depth layers. The goal of this partitioning is to reduce the variation in depth and motion vector (direction and magnitude), thereby allowing for a better reconstruction filter in each partition. Vaidyanathan et al., 2013 assumed a Gaussian aperture, and designed a filter kernel per partition, not a unique filter per pixel. See Vaidyanathan, et al., Layered Reconstruction for Defocus Blur, http://software*intel*com/en-us/articles/layered-light-field-reconstruction-for defocus-blur (asterisks replacing periods to avoid inadvertant hyperlinks). Their filter can therefore be efficiently evaluated as an integration over the uv dimensions, followed by a convolution in screen space, xy. Their approach may be extended to include motion blur, by assuming a Gaussian shutter function, and aiming at integrating in the uvt dimensions first, followed by screen space convolution. This is in contrast to previous work on sheared filters and reprojection techniques, where a unique kernel is derived per pixel, and filters are evaluated by, for each pixel, performing a costly search in a high dimensional data structure of samples.

From Equation 6, the energy of the light field spectra for a diffuse emitter can be mostly approximated by a plane through the origin. For a partition of samples with similar depth values and motion vectors, the spectrum will be approximated by a collection of parametric planes, where the planes' coefficients are functions of a depth and motion vector. Since all planes go through the origin, the spectrum of a set of samples will be a hyper-wedge, similar to how the shape of the spectrum is a wedge for a 2D slice, e.g., $(\Omega_x, \Omega_u)$ or $(\Omega_x, \Omega_t)$.

A Gaussian aperture bandlimits the spectrum at $\Omega_u = \pm \Omega_u^{max}$, $\Omega_v = \pm \Omega_v^{max}$ and a Gaussian shutter at $\Omega_t = \pm \Omega_t^{max}$. In a rotated coordinate system (Equation 3), the $\Omega_y$ and $\Omega_v$ components of the plane equation are independent of $\Omega_t$, so the filter design can be separated in the $(\Omega_y, \Omega_v)$ and $(\Omega_x, \Omega_u, \Omega_t)$ subspaces. The filter in $(\Omega_y, \Omega_v)$ has been previously described in detail by Vaidyanathan et al., 2013, and can be efficiently implemented using oblique projections to capture the anisotropy of the light field. Next, our novel filter is described in the $(\Omega_x, \Omega_u, \Omega_t)$ subspace.

From Equation 6, in the $(\Omega_x, \Omega_u, \Omega_t)$ subspace, the spectrum from a diffuse emitter will have energy along the parametric line (a ray through the origin):

$$r(\Omega_x) = \Omega_x(1, c(z), -d_x/z) \in \mathbb{R}^3. \tag{7}$$

Within each partition, there is variation in the circle of confusion $c(z) \in [c_{min}, c_{max}]$ and motion magnitude $$-\frac{d_x}{z} \in [d_{min}, d_{max}].$$

Figure 3:
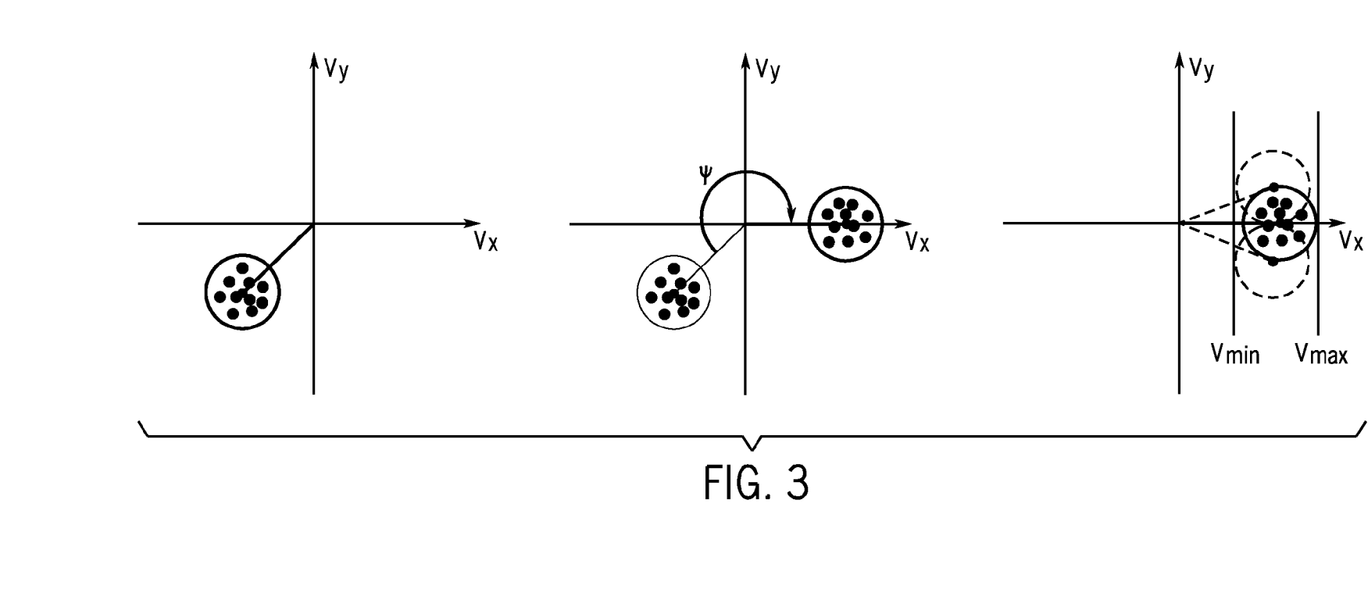
FIG. 3 is a depiction of bounding and rotating vectors, with the left depiction showing finding the average motion vector and a bounding circle, the middle depiction shows rotating an angle ψ such that the average motion vector aligns with the x-axis and the right depiction shows finding $v_{min}$ and $v_{max}$ by taking the spread in motion vectors into account.

The variation in motion direction is taken into account by expanding the $[d_{min}, d_{max}]$ range accordingly, as shown in FIG. 3. These variations produce rays in different directions, spanning a (double) frustum.

Figure 4:
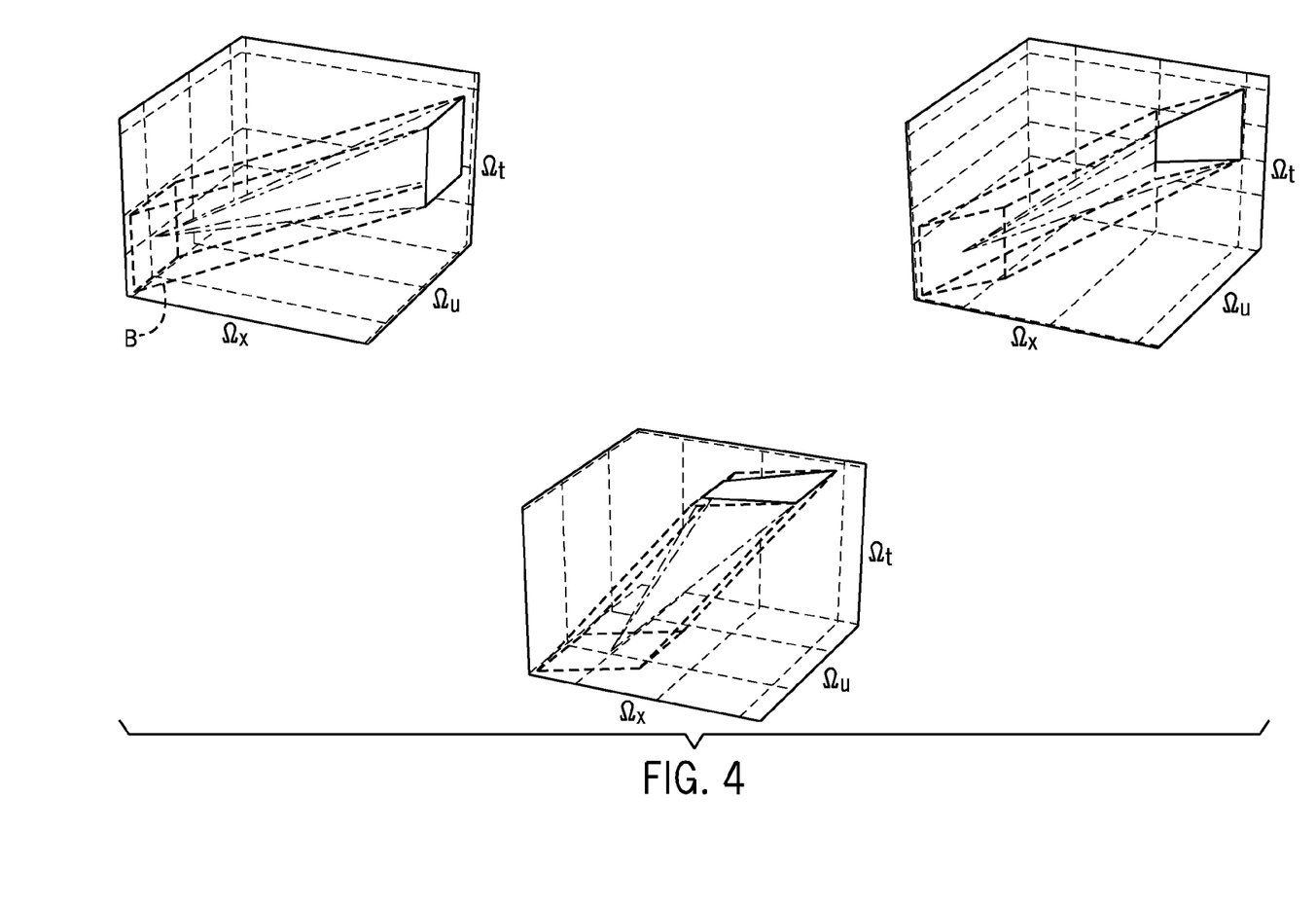
FIG. 4 is a depiction of light field spectrum bounds in the $\Omega_x$, $\Omega_u$, $\Omega_t$ slice (showing the part of the spectrum in the positive quadrant) such that the spectrum has energy along a set of lines through the origin and depending on the motion amplitude and defocus blur, the spectrum bandlimit in either $\Omega_u$ (left), $\Omega_t$ (middle), or $\Omega_x$ (right) will clip the frustum first.

In a typical scenario, depending on the magnitude of motion and the circle of confusion, one of the bandlimits in $\Omega_u$, $\Omega_t$ or $\Omega_x$ will clip the frustum first, as shown in FIG. 4. In cases where the spectrum is clipped by bandlimits along two or more axes, the filter design may be simplified by selecting a single clip plane that is intersected first by the corner ray $r_c(\Omega_x) = \Omega_x(1, c_{min}, d_{min})$ Therefore, the filter bounds are conservative and may include a portion of the spectrum that is clipped by the other bandlimits. For each of the three clipping scenarios, the clipped double frustum may be approximated using a scaled and sheared Gaussian distribution.

Clipping against $\Omega_u = \Omega_u^{max}$: To approximate the clipped spectrum, an isotropic Gaussian distribution is transformed in $\mathbb{R}^3$ with a scale $(s_x, s_u, s_t)$, followed by a sequence of two shears as shown by the box B in FIG. 4 (upper left):
1. A shear in $\Omega_x$ as function of $\Omega_u$: $\Omega_x = \Omega_x + \alpha \Omega_u$.
2. A shear in $\Omega_t$ as function of $\Omega_x$: $\Omega_t = \Omega_t + \beta \Omega_x$.

The concatenation of the scaling and these two shears is a matrix of the form:

$$S = \begin{bmatrix} 1 & \alpha & 0 \\ 0 & 1 & 0 \\ \beta & \alpha\beta & 1 \end{bmatrix} \begin{bmatrix} s_x & 0 & 0 \\ 0 & s_u & 0 \\ 0 & 0 & s_t \end{bmatrix} \tag{8}$$

The parameters are derived in Appendix B.

Given the warp matrix S, the multivariate Gaussian density distribution in the Fourier space $\Omega = (\Omega_x, \Omega_u, \Omega_t)$, can now be written as:

$$w(\Omega) = |S|^{-1} e^{-\frac{1}{2} \Omega^T (SS^T)^{-1} \Omega}. \tag{9}$$

However, in order to derive an efficient filter formulation (discussed later), a warp matrix may be of the form:

$$S' = \begin{bmatrix} 1 & 0 & 0 \\ \eta & 1 & 0 \\ \xi & 0 & 1 \end{bmatrix} \begin{bmatrix} s'_x & 0 & 0 \\ 0 & s'_u & 0 \\ 0 & 0 & s'_t \end{bmatrix} \tag{10}$$

To replace the transform S with S' without changing the underlying Gaussian distribution, the approach proposed by Vaidyanathan et al., 2013 may be extended and then enforce:

$$SS^T = S'S'^T. \tag{11}$$

Solving Equation 11, one obtains:

$$s_{x'} = \gamma, \; s_{u'} = \frac{s_x s_u}{\gamma}, \; s_{t'} = s_t, \; \eta = \frac{\alpha s_u^2}{\gamma^2}, \; \xi = \beta, \tag{12}$$

where $\gamma = \sqrt{s_x^2 + \alpha^2 s_u^2}$.

Clipping against $\Omega_t = \Omega_t^{max}$ can be handled similarly, with the $\Omega_t$ and $\Omega_u$ axes swapped.

Clipping against $\Omega_x = \Omega_x^{max}$: The two shear transforms in this case are (FIG. 4 (bottom)):
1. A shear in $\Omega_t$ as function of $\Omega_x$: $\Omega_t = \Omega_t + \beta \Omega_x$.
2. A shear in $\Omega_u$ as function of $\Omega_x$: $\Omega_u = \Omega_u + \alpha \Omega_x$.

The corresponding transformation matrix is given by:

$$S = \begin{bmatrix} 1 & 0 & 0 \\ \alpha & 1 & 0 \\ \beta & 0 & 1 \end{bmatrix} \begin{bmatrix} s_x & 0 & 0 \\ 0 & s_u & 0 \\ 0 & 0 & s_t \end{bmatrix}. \tag{15}$$

In this case, the matrix S is already in the desired form and therefore S'=S.

Primal domain filter. To create the corresponding filter in the primal domain, transform an (un-normalized) isotropic multivariate Gaussian distribution with standard deviation $\sigma=1$:

$$w(x; \sigma = 1) = e^{-\frac{1}{2}x^T x} \tag{16}$$

using $S'^{-T}$. The transformed Gaussian is then:

$$w(x) = |S'|e^{-\frac{1}{2}x^T(S'S'^T)x}. \tag{17}$$

Using the coordinate transform $x'=s'^T x$, and omitting the normalization factor, this filter can be written as a product of three scalar Gaussian filters:

$$w_{shear}(x, y, t) = \underbrace{w(x + \eta u + \xi t; \sigma_x)}_{w_x}\underbrace{w(u; \sigma_u)}_{w_u}\underbrace{w(t; \sigma_t)}_{w_y}, \tag{18}$$

where $\sigma_x=(s_{x'})^{-1}$, $\sigma_u=(s_{u'})^{-1}$, and $\sigma_t=(s_{t'})^{-1}$. This filter is applied to the primal domain light field at the sensor within the current depth layer. Note that this filter reverts exactly to a sheared motion blur filter when the lens size is zero and to Vaidyanathan's (Vaidyanathan 2013) sheared defocus blur filter if the motion vectors are zero.

EXAMPLE

To find the irradiance, $e(x)$, for a certain pixel, integrate over (xut) in the depth layer using the $w_u$ and $w_t$ filters (aperture, shutter) and then convolve in x:

$$e(x) = \iiint l(x', u, t)w_{shear}(x' - x, u, t)dx'dudt \tag{19}$$

$$= \iiint l(x', u, t)w_x(x' - x + \eta u + \xi t)w_u(u)w_t(t)dx'dudt$$

[Let $p = x' + \eta u + \xi t, dp = dx'$]

$$= \int \underbrace{\left(\iint l(p - \eta u - \xi t, u, t)w_u(u)w_t(t)dudt\right)}_{I_{ut}(p)}w_x(p - x)dp$$

$$= \int I_{ut}(p)w_x(p - x)dp$$

$$= (I_{ut} * w_x)(x).$$

In a practical implementation, $I_{ut}$ can be implemented by accumulating $l_i w_u(u_i) w_t(t_i)$ at the screen space position $p=x_i+\theta u_i+\xi t_i$ for each sample $(x_i,u_i,t_i)$. The irradiance is then obtained by convolving with the screen space filter $w_x$.

The filter applied in a depth layer is a separable sheared filter in (u,v,t) and (y,v), where one can collapse (x,u,t)→p and (y,v)→q, where (p,q) are pixel coordinates. A separable screen space filter is then applied over the accumulated values in screen space, (p,q). Separating the filter into an integration and convolution pass is critical for performance, in some embodiments. The integration can be efficiently implemented by scaling and reprojecting all the samples to the center of the lens at a unique time. The convolution pass can then be expressed as a separable Gaussian filter in screen space.

The filtered layers may be composited together such that occlusion between layers is taken into account. For this, Vaidyanathan et al.'s 2013 approach may be followed.

The irradiance may be approximated by pre-integrating the radiance and opacity over the lens and shutter separately within each layer, i.e., directly using the product of the average opacities over the lens and shutter for each layer in front of j when factoring in the radiance from layer j. This is in contrast to the exact result obtained from integrating over the opacity of layers in front of j within the lens integral and over the shutter.

For each screen space tile, containing W×H pixels, samples in a search window of size $W_s \times H_s$ may be collected. The samples are then statically partitioned in depth. A uniform set of depth layers may be used, which add a set of layers symmetrically around the plane in focus, following Vaidyanathan et al. 2013.

The integrated opacity, $\bar{\alpha}_j(x)$, and irradiance, $e_j(x)$, for a layer j are evaluated according to the pseudo code in Algorithm 1 and Algorithm 2.

```
Algorithm 1: Reprojection step for layer j
for all light field samples x_i do
    Compute p, q (Eq. 24), and w = w_u(u_i)w_v(v_i)w_t(t_i)
    if z_i in depth range of layer j then
        l_α(p, q) += w                              [opacity]
        l_e(p, q) += l(x_i)w                        [irradiance]
        l_w(p, q) += w                              [weight]
    else if z_i is in layer k > j then
        l_w(p; q) += w                              [∝ = 0 in current
layer]
    end if
end for
Algorithm 2: Screen space filter for layer j
for all pixels (x,y) in search window do          [along motion]
    for all k in [-radius, radius] do
        x' = x + cos(ψ)k
        y' = y - sin(ψ)k
        w = w_x(k)
        Get l_α, l_e, and l_w at (x', y')
        ᾱ(x,y) += l_α w
        ē(x,y) += l_e w
        w̄(x,y) += l_w w
    end for
end for
for all pixels (x,y) in search window do      [perpendicular to motion]
    for all k in [-radius, radius] do
        x' = x + sin(ψ)k
        y' = y + cos(ψ)k
        w = w_x(k)
        ᾱ(x,y) += ᾱ(x',y')w
        ē(x,y) += ē(x',y')w
        w̄(x,y) += w̄(x',y')w
    end for
end for
for all pixels (p_i; q_i) in tile do
    ᾱ(x; y) = ᾱ/w̄, e_j(x; y) = ē/w̄           [Normalization]
```

This includes a reprojection step that evaluates the inner integrals in Equation 19, followed by a 2D screen space filter. Applying the defocus filter from Vaidyanathan et al in yv and the new filter in xut, the 5D reconstruction filter can, in the rotated coordinate system, be expressed as a product of five scalar Gaussian filters:

$$\underbrace{w(x + \eta u + \xi t; \sigma_x)}_{w_x}\underbrace{w(y + \rho v; \sigma_y)}_{w_y}\underbrace{w(u; \sigma_u)}_{w_u}\underbrace{w(v; \sigma_v)}_{w_v}\underbrace{w(t; \sigma_t)}_{w_t}. \tag{23}$$

The reprojection step is expressed in a rotated coordinate system, which is unique for each layer (i.e., determined by the direction of the layers average motion vector). In order to composite samples from different layers, directly accumulate samples in the (unrotated) (x,y) coordinate frame. To evaluate the filter for each input sample with index i, we accumulate $l_i w_u(u_i) w_v(v_i) w_t(t_i)$ at the pixel position, (p,q):

$$\begin{bmatrix} p \\ q \end{bmatrix} = \begin{bmatrix} x_i \\ y_i \end{bmatrix} + R^T \begin{bmatrix} \eta & 0 \\ 0 & \rho \end{bmatrix} R \begin{bmatrix} u_i \\ v_i \end{bmatrix} + R^T \begin{bmatrix} \xi \\ 0 \end{bmatrix} t_i. \qquad (24)$$

Similarly, a screen space rotation may be applied when evaluating the Gaussian screen space filter (separable convolution in xy). Finally, the filtered layers are composited together using the same approach as Vaidyanathan et al. 2013.

Most previous work derives a unique reconstruction filter for each pixel, which guides a subsequent pass of adaptive sampling before reconstruction. In contrast, a reconstruction filter may be derived for each depth layer (i.e., a set of samples at similar depths in a tile), without relying on an additional sampling pass. As previously shown, by applying a common filter to all samples in a partition, one can reuse many shared computations, which makes the filter evaluation highly efficient. For defocus blur, this approximation works very well, as the size of the isotropic filter is only a function of the sample's depth (i.e., the circle of confusion). Motion blur, however, is a highly anisotropic effect, and the approximation of one common filter for many samples is more severe. If samples in a partition have highly varying motion vectors, the reconstruction filter is very small. Depth partitioning alleviates this issue as seen in our results. For the case of samples very close both spatially and in depth, but with large variation in motion vectors, however, the reconstructed image may have more noise in that tile.

A high quality reconstruction algorithm may run in near real-time. To achieve this goal, approximations are introduced to trade image quality for performance in one embodiment.

Appendix A. Light Field Operators

The light transport operators applied to the primary domain light field are listed. For the lens operator, $L_F$, set the image plane at z=1 and express it in terms of the distance to the plane in focus, F, using the thin lens formula 1/f=1+1/F, where f is the focal length. At the sensor, transform from angular coordinates to lens coordinates $(u,v)=(x+\tan\theta, y+\tan\phi)$, which, similar to previous work, we locally approximate with $(u,v)=(x+\theta, y+\phi)$. Denote this coordinate transform $C:(x,y,\theta,\phi,t) \rightarrow (x,y,u,v,t)$, and concatenate C to the lens operator.

$$V_x = \begin{bmatrix} 1 & 0 & 0 & 0 & d \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{bmatrix}, T_z = \begin{bmatrix} 1 & 0 & -z & 0 & 0 \\ 0 & 1 & 0 & -z & 0 \\ 0 & 0 & 1 & 0 & 0 \\ 0 & 0 & 0 & 1 & 0 \\ 0 & 0 & 0 & 0 & 1 \end{bmatrix},$$

$$CL_F = \begin{bmatrix} -\frac{1}{F} & 0 & -1 & 0 & 0 \\ 0 & -\frac{1}{F} & 0 & -1 & 0 \\ 1 & 0 & 0 & 0 & 0 \\ 0 & 1 & 0 & 0 & 0 \\ 0 & 0 & 0 & 0 & 1 \end{bmatrix}$$

$$R_z = \begin{bmatrix} \cos\psi & -\sin\psi & 0 & 0 & 0 \\ \sin\psi & \cos\psi & 0 & 0 & 0 \\ 0 & 0 & \cos\psi & -\sin\psi & 0 \\ 0 & 0 & \sin\psi & \cos\psi & 0 \\ 0 & 0 & 0 & 0 & 1 \end{bmatrix}$$

The light field transform in a rotated coordinate system, i.e., where the motion vector is aligned with the x-axis, is defined as:

$$M = CL_F T_z V_x^{-1} = \begin{bmatrix} -\frac{1}{F} & 0 & \frac{z-F}{F} & 0 & \frac{d}{F} \\ 0 & -\frac{1}{F} & 0 & \frac{z-F}{F} & 0 \\ 1 & 0 & -z & 0 & -d \\ 0 & 1 & 0 & -z & 0 \\ 0 & 0 & 0 & 0 & 1 \end{bmatrix}, \qquad (25)$$

Appendix B. Filter Parameters

Approximate the clipped frequency spectrum by applying a scale followed by two shears to an isotropic Gaussian distribution. Derive the the scale and shear values separately for the three cases, where the spectrum gets clipped along the $\Omega_u$, $f_t$ or $\Omega_x$ axis.

Figure 5:
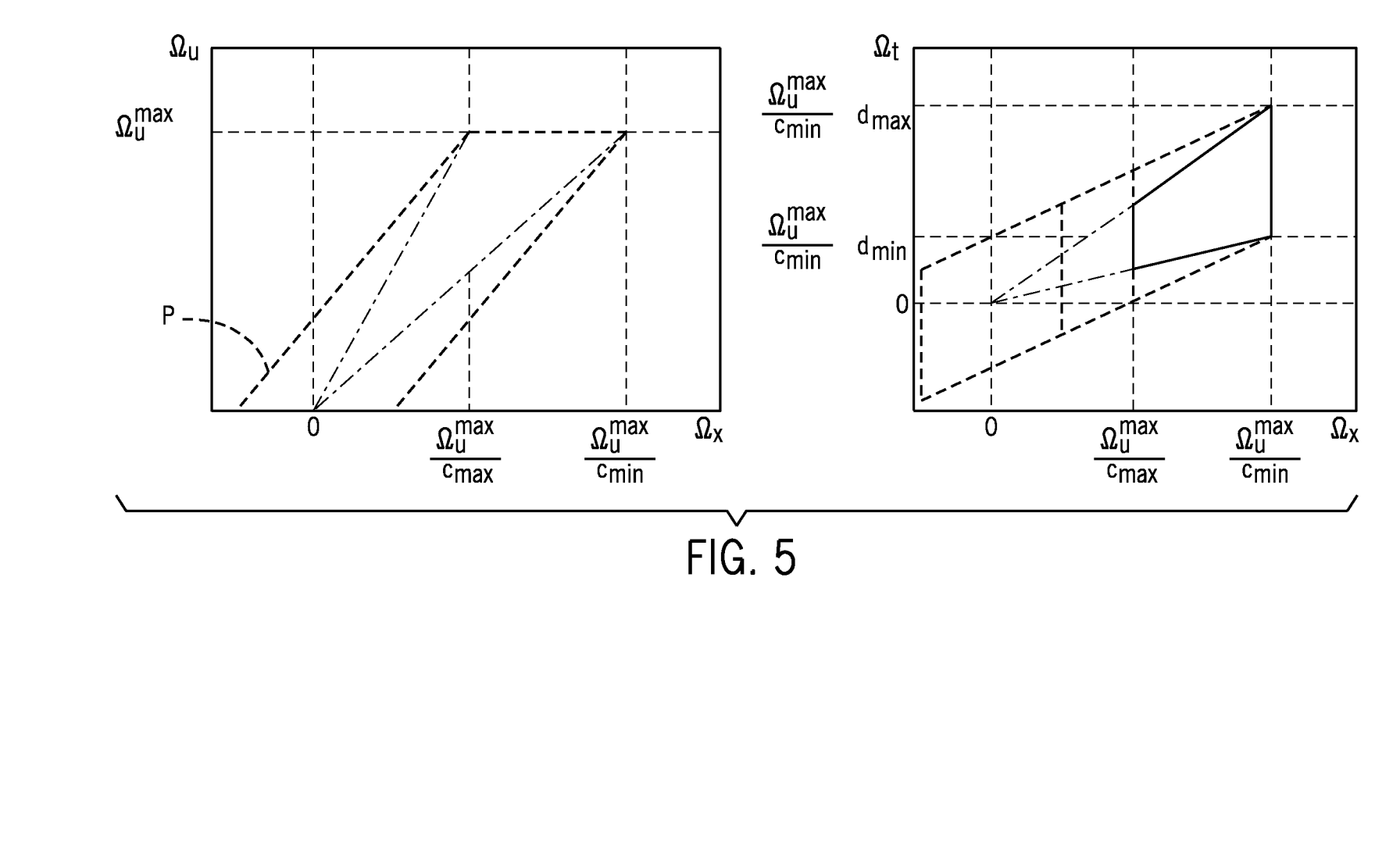
FIG. 5 is a projection of the 3D frequency bounds shown in FIG. 4 for the case where the spectrum gets clipped along the $\Omega_u$ axis. The left depiction is in the $(\Omega_x, \Omega_u)$ space and the right depiction is a projection in the $(\Omega_x, \Omega_t)$ space showing the frequency bounds and intersection of the spectrum with the $\Omega_u = \Omega_u^{max}$ plane.

Clipping against $\Omega_u = \Omega_u^{max}$:

FIG. 5 (left) shows the frequency bounds in the $(\Omega_x, \Omega_u)$ space, where the spectrum is clipped at $\Omega_u = \Omega_u^{max}$. The transformed Gaussian distribution, which approximates the light field spectrum, is represented by the parallelogram p, which can be derived from an isotropic unit Gaussian, by applying a scale $$(s_x, s_u, s_t) = 2\pi \Omega_u^{max} \left( \left| \frac{c_{max} - c_{min}}{2 c_{min} c_{max}} \right|, 1, \left| \frac{d_{max} - d_{min}}{2 c_{min}} \right| \right) \qquad (26)$$

where $(s_x, s_u)$ are equal to half of the width and height of the parallelogram, then shear $\alpha$ in $\Omega_x$ as function of $\Omega_u$, where $$\alpha = \frac{c_{max} + c_{min}}{2 c_{min} c_{max}}.$$

The scaling coefficient $s_t$ is obtained by looking at FIG. 5 (right), which shows a projection of the frequency bounds in the $(\Omega_x, \Omega_t)$ space. Here, the box that represents the transformed 3D Gaussian, projects to a parallelogram with height $$h = \Omega_u^{max} \left| \frac{d_{max} - d_{min}}{c_{min}} \right|,$$

thus, $s_t = \pi h$. Finally, the second shear $$\beta = \frac{d_{max} + d_{min}}{2}$$

applied in $\Omega_t$ as function of $\Omega_x$ is given by the average slope of the light field spectrum in $(\Omega_x, \Omega_t)$.

Note that the values $s_x, s_u$ and $\alpha$ correspond exactly to the defocus blur filter of Vaidyanathan et al., 2013.

Figure 6:
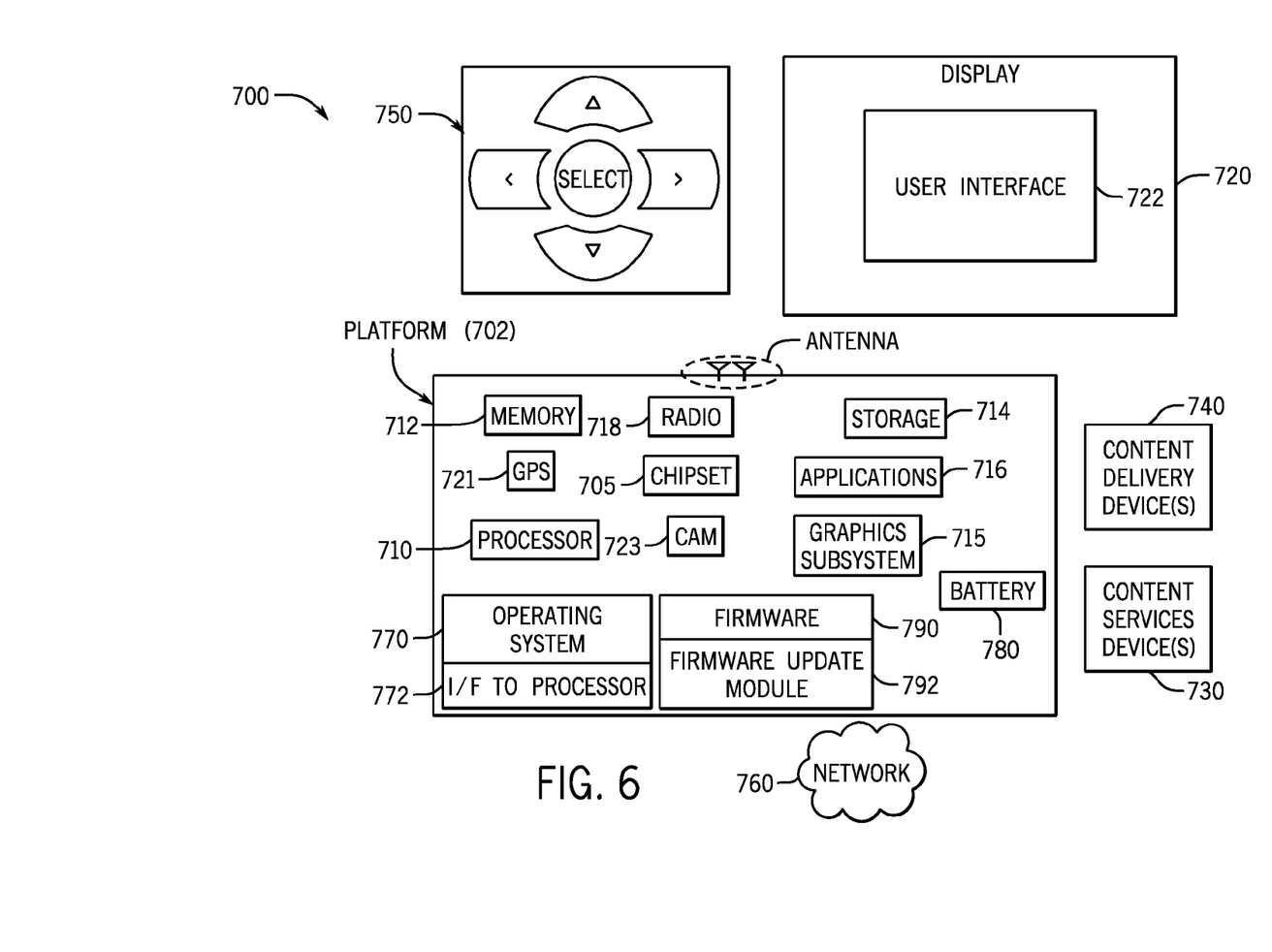
FIG. 6 is a system depiction for one embodiment.

FIG. 6 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequence of FIG. 1 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit the applicable embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to be scope limiting.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
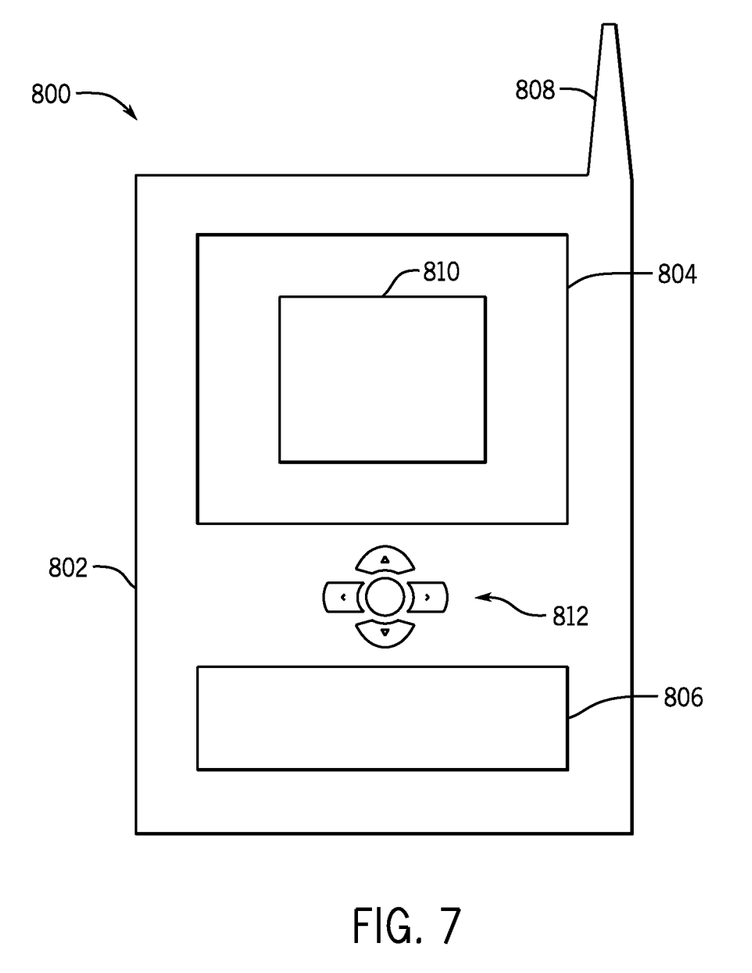
FIG. 7 is a front elevation view of a system according to one embodiment.

As described above, system 700 may be embodied in varying physical styles or form factors. FIG. 7 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

The sequences described herein may be implemented in hardware, software and/or firmware. In software and firmware embodiments the sequences may be implemented by one or more non-transitory computer readable media storing instructions executed by a processor.

One example of an embodiment may be a method including grouping input samples from a sampled light field into partitions, integrating over lens positions and time within a frame, convolving in screen space using a reconstruction filter, and compositing layers in front to back order using alpha blending based on opacity values. The method may also include generating said light field by stochastic sampling in a distributed ray tracer or stochastic rasterizer. The method may also include generating said light field using interleaved sampling in a rasterizer or ray tracer. The method may also include generating the light field with a depth value, a three dimensional motion vector, and a radiance value for each five dimensional input coordinates. The method may also include deriving a set of depth layers for each screen space tile and applying a common sheared reconstruction filter in five dimensions for all samples within a partition. The method may also include transforming the light field from a moving coordinate system at a depth to a light field at a sensor. The method may also include using a coordinate transformed from angles to lens coordinates at the sensor and expressing the motion operator in terms of rotations and a motion purely along a coordinate axis aligned with a coordinate axis in screen space. The method may also include separating the filter into integration and convolution paths and including integrating by scaling and reprojecting all samples to the center of a lens at a unique time. The method may also include expressing the convolution path as a separable Gaussian filter in screen space. The method may also include approximating irradiance by pre-integrating the radiance and opacity over the lens and shutter separately within each layer.

In another example, one or more non-transitory computer readable media may store instructions to perform a sequence to group input samples from a sampled light field into partitions, integrate over lens positions and time within a frame, convolve in screen space using a reconstruction filter, and composite layers in front to back order using alpha blending based on opacity values. The media may also include generating said light field by stochastic sampling in a distributed ray tracer or stochastic rasterizer. The media may also include generating said light field using interleaved sampling in a rasterizer or ray tracer. The media may also include generating the light field with a depth value, a three dimensional motion vector, and a radiance value for each five dimensional input coordinates. The media may also include deriving a set of depth layers for each screen space tile and applying a common sheared reconstruction filter in five dimensions for all samples within a partition. The media may also include transforming the light field from a moving coordinate system at a depth to a light field at a sensor. The media may also include using a coordinate transformed from angles to lens coordinates at the sensor and expressing the motion operator in terms of rotations and a motion purely along a coordinate axis aligned with a coordinate axis in screen space. The media may also include separating the filter into integration and convolution paths and including integrating by scaling and reprojecting all samples to the center of a lens at a unique time. The media may also include expressing the convolution path as a separable Gaussian filter in screen space. The media may also include approximating irradiance by pre-integrating the radiance and opacity over the lens and shutter separately within each layer.

Another example may be an apparatus that includes a processor to group input samples from a sampled light field into partitions, integrate over lens positions and time within a frame, convolve in screen space using a reconstruction filter, and composite layers in front to back order using alpha blending based on opacity values, and a storage coupled to said processor. The apparatus may also generate said light field by stochastic sampling in a distributed ray tracer or stochastic rasterizer. The apparatus may also generate said light field using interleaved sampling in a rasterizer or ray tracer. The apparatus may also generate the light field with a depth value, a three dimensional motion vector, and a radiance value for each five dimensional input coordinates. The apparatus may also derive a set of depth layers for each screen space tile and applying a common sheared reconstruction filter in five dimensions for all samples within a partition. The apparatus may also transform the light field from a moving coordinate system at a depth to a light field at a sensor. The apparatus may also use a coordinate transformed from angles to lens coordinates at the sensor and expressing the motion operator in terms of rotations and a motion purely along a coordinate axis aligned with a coordinate axis in screen space. The apparatus may also include an operating system, a battery, and firmware and a module to update said firmware.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
   grouping input samples from a sampled light field into partitions;
   integrating over lens positions and time within a frame;
   convolving in screen space using a reconstruction filter; and
   compositing layers in depth order using alpha blending based on opacity values.

2. The method of claim 1 including generating said light field by stochastic sampling in a distributed ray tracer or stochastic rasterizer.

3. The method of claim 1 including generating said light field using interleaved sampling in a rasterizer or ray tracer.

4. The method of claim 1 including generating the light field with a depth value, a three dimensional motion vector, and a radiance value for each five dimensional input coordinates.

5. The method of claim 1 wherein grouping into partitions includes deriving a set of depth layers for each screen space tile and applying a common sheared reconstruction filter in five dimensions for all samples within a partition.

6. The method of claim 1 including transforming the light field from a moving coordinate system at a depth to a light field at a sensor.

7. The method of claim 6 including using a coordinate transformed from angles to lens coordinates at the sensor and expressing the motion operator in terms of rotations and a motion purely along a coordinate axis aligned with a coordinate axis in screen space.

8. The method of claim 1 including separating the filter into integration and convolution paths and including integrating by scaling and reprojecting all samples to the center of a lens at a unique time.

9. The method of claim 8 including expressing the convolution path as a separable Gaussian filter in screen space.

10. The method of claim 1 including approximating irradiance by pre-integrating the radiance and opacity over the lens and shutter separately within each layer.

11. One or more non-transitory computer readable media storing instructions executed by a processor to perform a sequence comprising:
grouping input samples from a sampled light field into partitions;
integrating over lens positions and time within a frame;
convolving in screen space using a reconstruction filter; and
compositing layers in depth order using alpha blending based on opacity values.

12. The media of claim 11, said sequence including generating said light field by stochastic sampling in a distributed ray tracer or stochastic rasterizer.

13. The media of claim 11, said sequence including generating said light field using interleaved sampling in a rasterizer or ray tracer.

14. The media of claim 11, said sequence including generating the light field with a depth value, a three dimensional motion vector, and a radiance value for each five dimensional input coordinates.

15. The media of claim 11 wherein grouping into partitions includes deriving a set of depth layers for each screen space tile and applying a common sheared reconstruction filter in five dimensions for all samples within a partition.

16. The media of claim 11, said sequence including transforming the light field from a moving coordinate system at a depth to a light field at a sensor.

17. The media of claim 16, said sequence including using a coordinate transformed from angles to lens coordinates at the sensor and expressing the motion operator in terms of rotations and a motion purely along a coordinate axis aligned with a coordinate axis in screen space.

18. The media of claim 11, said sequence including separating the filter into integration and convolution paths and including integrating by scaling and reprojecting all samples to the center of a lens at a unique time.

19. The media of claim 18, said sequence including expressing the convolution path as a separable Gaussian filter in screen space.

20. The media of claim 11, said sequence including approximating irradiance by pre-integrating the radiance and opacity over the lens and shutter separately within each layer.

21. An apparatus comprising:
a processor to:
group input samples from a sampled light field into partitions, integrate over lens positions and time within a frame, convolve in screen space using a reconstruction filter, and composite layers in depth order using alpha blending based on opacity values; and
a storage coupled to said processor.

22. The apparatus of claim 21, said processor to generate said light field by stochastic sampling in a distributed ray tracer or stochastic rasterizer.

23. The apparatus of claim 21, said processor to generate said light field using interleaved sampling in a rasterizer or ray tracer.

24. The apparatus of claim 21, said processor to generate the light field with a depth value, a three dimensional motion vector, and a radiance value for each five dimensional input coordinates.

25. The apparatus of claim 21 wherein grouping into partitions includes deriving a set of depth layers for each screen space tile and applying a common sheared reconstruction filter in five dimensions for all samples within a partition.

26. The apparatus of claim 21, said processor to transform the light field from a moving coordinate system at a depth to a light field at a sensor.

27. The apparatus of claim 26, said processor to use a coordinate transformed from angles to lens coordinates at the sensor and expressing the motion operator in terms of rotations and a motion purely along a coordinate axis aligned with a coordinate axis in screen space.

28. The apparatus of claim 21 including an operating system.

29. The apparatus of claim 21 including a battery.

30. The apparatus of claim 21 including firmware and a module to update said firmware.

* * * * *